March 10, 1936.  W. F. OLIVER  2,033,353
HYDRAULIC SYSTEM FOR JACKS
Filed May 11, 1933
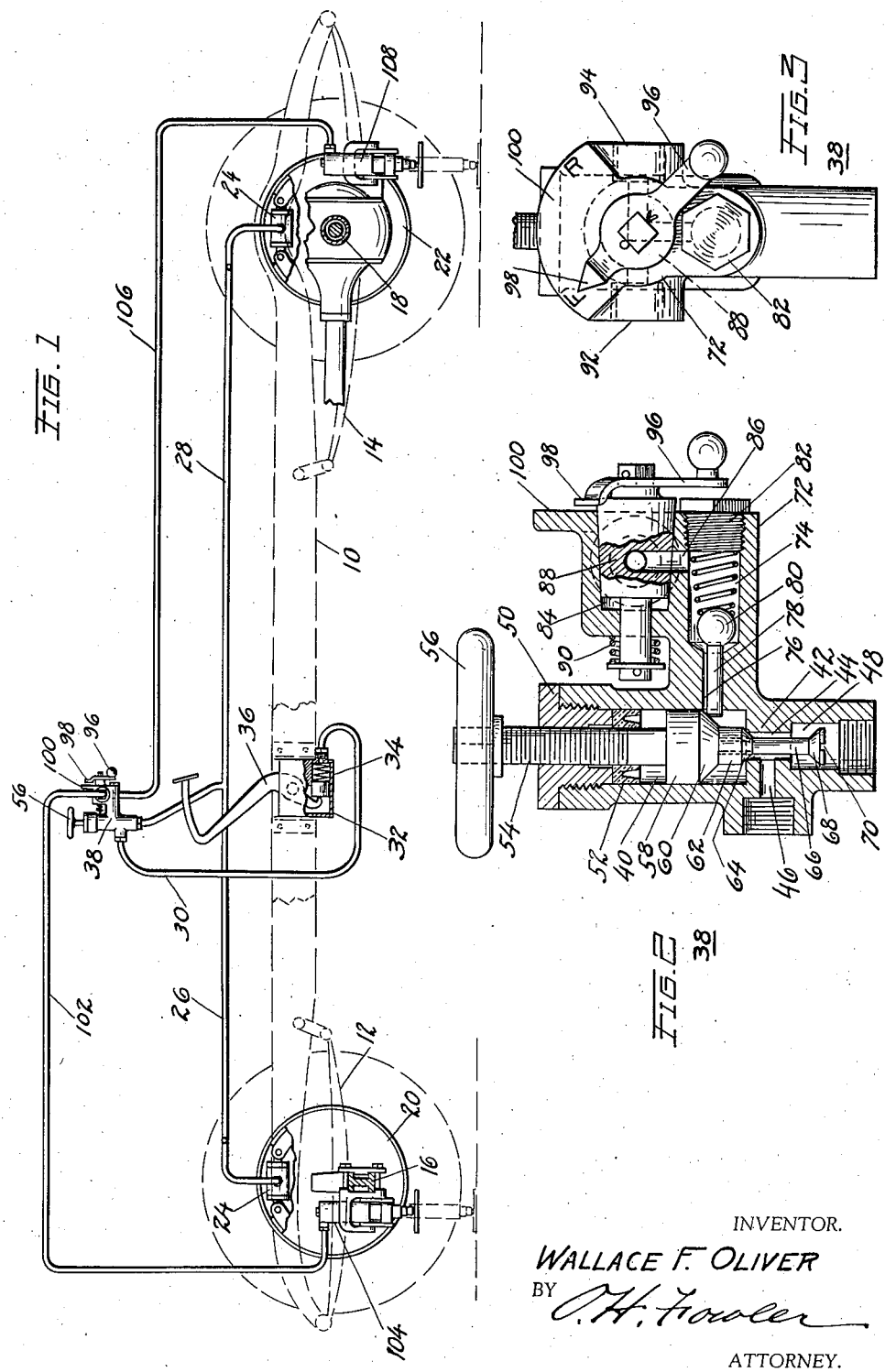
INVENTOR.
WALLACE F. OLIVER
BY
ATTORNEY.

Patented Mar. 10, 1936

2,033,353

UNITED STATES PATENT OFFICE 2,033,353

HYDRAULIC SYSTEM FOR JACKS

Wallace F. Oliver, Detroit, Mich., assignor to Hydraulic Brake Company, Detroit, Mich., a corporation of California Application May 11, 1933, Serial No. 670,610

3 Claims. (Cl. 277—26)

This invention relates to hydraulic jacks and more particularly to fluid pressure systems for operating hydraulic jacks.

The invention comprehends a hydraulic system for operating a plurality of jacks in combination with a hydraulic system of conventional type for operating a plurality of brakes. The system is normally adjusted so that regular braking operations are in no way affected. However, the system may be adjusted to cut out the supply of fluid from a compression element or a master operating cylinder to expansible elements or cylinders associated with the friction elements of the brakes and to cut in the jacks, and selection may be made as to the jack it is desired to operate.

When the system is adjusted to cut out the cylinders associated with the brakes and to cut in the jacks, the foot pedal lever may be depressed to actuate the master cylinder to displace fluid therefrom through a valve and suitable conduits to the jack, and a suitable check valve connected in the system inhibits the return of the fluid, so that upon repeated actuation of the foot pedal, resulting in complementary actuation of the master cylinder, suitable pressure may be built up in the jack for the effective operation thereof.

When adjustment is made to cut out the jacks and to cut in the cylinders associated with the brakes, the check valve is tripped to permit the return of the fluid from the jack to the braking system.

An object of the invention is to provide means for operating a plurality of hydraulic jacks coupled with a hydraulic brake system of conventional type, so that the brake pedal and the master cylinder of the braking system may be employed for actuating the jacks.

Another object of the invention is to provide a plurality of hydraulic jacks and means for selectively operating the jacks through the operating mechanism of a hydraulic system including a master cylinder and a foot pedal lever for actuating the master cylinder.

Other objects and structural details will be apparent from the subjoined description taken in connection with the accompanying drawing, in which,—

Figure 1 is a side elevation of a motor vehicle chassis equipped with a hydraulic brake system coupled with a hydraulic system for operating a plurality of jacks.

Figure 2 is a vertical sectional view of a control valve, and

Figure 3 is a front elevation of the valve.

Referring by numerals to the drawing, 10 represents the frame of a motor vehicle chassis. The frame is supported by front springs 12 and rear springs 14 mounted respectively on a front axle 16 and a rear axle 18. The axles have mounted thereon conventional wheels.

Front brakes 20 and rear brakes 22 are associated with the front and rear wheels, respectively. The brakes are of the hydraulic type, each brake includes a drum secured to a wheel, a backing plate associated with the drum, friction elements on the backing plate for cooperation with the drum, and a cylinder or an expansible element 24 adaptable for spreading the friction elements into drum engagement.

The cylinder 24 is connected by suitable pipe lines or conduits 26 and 28 to a pipe line or conduit 30 connected to a fluid supply tank 32 suitably supported on the frame of the chassis, and the supply tank houses a compression element or a master cylinder 34 operatable through a foot pedal lever 36. This braking system is of conventional type, and accordingly a full description of the structure is deemed unnecessary.

A valve 38 is connected in the pipe line or conduit 30. This valve has a chamber 40 provided with a partition 42 having an axial bore or passage 44. An inlet 46 communicates with the passage 44, and an outlet passage 48 is co-extensive with the passage 44. The passage 48 communicates with the conduits 26 and 28 leading to cylinders 24. A nut 50 threaded into the chamber 40 has on its inner face a leak-proof cup 52. The nut supports for travel a valve stem 54 extending axially through the cup. The stem has suitably secured thereto a hand wheel 56 of conventional type, and formed on the inner end of the stem is a cylindrical section 58 fitted snugly in the chamber.

On the lower end of the cylindrical section 58 is a conical section 60, the object of which will hereinafter appear. The conical section 60 terminates in a smaller cylindrical section 62, which in turn terminates in a conical section 64 adapted to close the upper end of the passage 44, and threaded into the conical section 64 is a stud 66, the shank of which extends through the passage 44. This stud has a conical head 68 adaptable for closing the lower end of the passage 44, and the head 68 is provided with a diametral slot 70 for the reception of a tool for adjustment purposes.

The valve 38 has a lateral boss 72 bored to provide a valve chamber 74 and a passage 76 providing a communication between the valve chamber 74 and the valve chamber 40. The passage 76 has slidably positioned therein a pin 78 arranged to engage the conical face 60 on the valve stem 54. The valve chamber 74 has therein a check valve including a spring-pressed ball 80 adapted to close the passage 76 and a closure plug 82 threaded in the upper end of the chamber 74 retains the ball and spring against displacement.

The boss 72 has formed therein a valve chamber 84 parallel to the valve chamber 74 and communicating with the valve chamber 74 by a passage 86. The chamber 84 has therein a two-way valve 88 held against displacement by a spring 90. This two-way valve controls diametrically disposed outlets 92 and 94, and is operable by a crank 96 having a pointer 98 playing over a dial 100 which includes letters indicating the front and rear jacks.

The outlet 92 is connected by a pipe line or conduit 102 to a hydraulic jack 104 suitably secured on the front axle of the vehicle, and the outlet 94 is connected by a pipe line or conduit 106 to a hydraulic jack 108 suitably secured on the rear axle of the vehicle.

In operation, the valve 38 is normally adjusted to close the upper end of the passage 44 so that regular operations of the brakes of the vehicle are not disturbed. When found desirable to employ a jack, the operator may elect either the front or rear jack by adjusting the valve 88 to close the port 92 and open the port 94, or the reverse.

The valve 38 is then adjusted to open the upper end of the passage 44 and to close the lower end of this passage. With the valves 38 and 88 so adjusted, upon depression of the foot pedal lever fluid is evacuated from the cylinder 34 through the conduit 30 to valve 38, through the upper end of the passage 44 and the valve chamber 40, and from thence through the passage 76 past the check valve 80 through the chamber 74, the port 86, valve 88, and port 92 or 94, according to selection, to the jack it is desired to operate.

The check valve 80 inhibits the return of the fluid from the jack. In operating the jack it may be found necessary to actuate the master cylinder 34 more than once in order to supply a sufficient quantity of fluid to the jack. Hence, it becomes necessary to provide means to check the back pressure so that the operation of the master cylinder will not be hampered.

When it is desired to lower the jack, the valve 38 is manipulated so that the conical face 60 on the valve stem engages and reciprocates the pin 78 to trip the valve 80, thus permitting the return of the fluid from the jack to the braking system. The return of the fluid from the jack is augmented by the return of the jack to its normal position. It is, of course, to be understood that the jacks are provided with return springs which are conventional in hydraulic jacks of the type employed. Upon return of the jacks to normal position, the valve 38 is further manipulated to close the upper end of the passage 44 and to open the lower end of this passage.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:—

1. A fluid control element comprising spaced two-way valves and a passage including a chamber connecting the valves, a check valve in the chamber, and means actuated by one of the valves for tripping the check valve when communication through said valve to the chamber is cut off.

2. A fluid control element comprising a pair of manually operated two-way valves and a passage connecting the valves including a chamber, a check valve in the chamber, and a reciprocable member in the passage actuated by one of the valves for tripping the check valve when communication through said valve to the chamber is cut off.

3. A fluid control element comprising a two-way valve, a passage connected to one outlet having a chamber; a check valve in said chamber, and means for holding the check valve unseated when communication through said two-way valve to the chamber is cut off.

WALLACE F. OLIVER.